United States Patent
Jain et al.

(10) Patent No.: US 9,756,108 B2
(45) Date of Patent: Sep. 5, 2017

(54) PRELOADING RESOURCES OF A WEB PAGE

(71) Applicant: Google Inc., Mountain View, CA (US)

(72) Inventors: Arvind Jain, Los Altos, CA (US); Anthony Charles Gentilcore, San Francisco, CA (US); Steven K. Souders, Los Altos, CA (US); Shishir Kumar Agrawal, Sunnyvale, CA (US); Stephen E. Lamm, Palo Alto, CA (US); Michael Kleber, Newton, MA (US); James Simonsen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 686 days.

(21) Appl. No.: 13/868,920

(22) Filed: Apr. 23, 2013

(65) Prior Publication Data
US 2015/0200994 A1  Jul. 16, 2015

Related U.S. Application Data

(60) Provisional application No. 61/652,806, filed on May 29, 2012.

(51) Int. Cl.
*G06F 17/30* (2006.01)
*H04L 29/08* (2006.01)

(52) U.S. Cl.
CPC .............. *H04L 67/02* (2013.01); *G06F 17/30* (2013.01); *H04L 67/2847* (2013.01)

(58) Field of Classification Search
CPC ................................................ G06F 17/30902
See application file for complete search history.

(56) References Cited

U.S. PATENT DOCUMENTS

| 6,098,064 | A  | * | 8/2000 | Pirolli ............... G06F 17/30902 |
| 6,105,029 | A  | * | 8/2000 | Maddalozzo, Jr. ...................... G06F 17/30864 |
| 6,339,785 | B1 | * | 1/2002 | Feigenbaum ........... H04L 29/06 709/213 |
| 8,984,048 | B1 | * | 3/2015 | Maniscalco ....... G06F 17/30902 709/201 |

(Continued)

OTHER PUBLICATIONS

"Web Application Optimization in RiOS 5.0," Riverbed Technology Whitepaper, 2007, 15 pages.

*Primary Examiner* — Oleg Survillo
*Assistant Examiner* — Christopher Cadorna
(74) *Attorney, Agent, or Firm* — McDermott Will & Emery LLP

(57) ABSTRACT

A computer-implemented method for preloading resources of a web page is provided. The method includes receiving a user request to navigate to a web page and issuing a request for a root page corresponding to the requested web page, wherein the root page identifies actual resources requested for loading the requested web page. The method also includes determining, based on a prior history of loading the requested web page, anticipated resources that are likely to be requested when loading the requested web page, and requesting the anticipated resources from a server associated with the anticipated resources at least until a time that the root page corresponding to the requested web page is received to determine the actual resources requested for loading the requested web page. Systems and machine-readable media are also provided.

21 Claims, 5 Drawing Sheets

(56) References Cited

U.S. PATENT DOCUMENTS

| | | | |
|---|---|---|---|
| 2002/0078165 A1* | 6/2002 | Genty | G06F 17/30902 |
| | | | 709/217 |
| 2004/0088375 A1 | 5/2004 | Sethi et al. | |
| 2006/0174068 A1* | 8/2006 | Drerup | G06F 13/28 |
| | | | 711/137 |
| 2006/0195507 A1* | 8/2006 | Baek | G06F 17/30905 |
| | | | 709/203 |
| 2007/0288484 A1* | 12/2007 | Yan | H04L 67/06 |
| 2008/0301316 A1* | 12/2008 | Alpern | G06F 9/4843 |
| | | | 709/231 |
| 2011/0066676 A1* | 3/2011 | Kleyzit | G06F 17/30902 |
| | | | 709/203 |
| 2011/0225302 A1* | 9/2011 | Park | H04L 65/4084 |
| | | | 709/227 |
| 2012/0317187 A1* | 12/2012 | Fredricksen | H04L 29/08729 |
| | | | 709/203 |
| 2014/0143513 A1* | 5/2014 | Reid | G06F 12/16 |
| | | | 711/162 |
| 2014/0250235 A1* | 9/2014 | Bradley | H04N 21/2407 |
| | | | 709/231 |

* cited by examiner

PRELOADING RESOURCES OF A WEB PAGE

CROSS-REFERENCE TO RELATED APPLICATION

This application claims the benefit of U.S. Provisional Patent Application No. 61/652,806, filed May 29, 2012, which is incorporated herein by reference in its entirety.

TECHNICAL FIELD

The present disclosure generally relates to loading web pages, and more particularly to preloading resources of a web page to improve web page loading times.

BACKGROUND

When an Internet user browses the web and accesses a web page, it takes time to load the web page on the user's client machine (e.g., a smart phone, tablet computer, laptop computer or desktop computer). Typically, when browsing the web, the user accesses multiple web pages, and the load times for each of the web pages that the user accesses add up, resulting in a significant amount of wait time for the user.

SUMMARY

The subject technology relates to a computer-implemented method for preloading resources of a web page. The method includes receiving a user request to navigate to a web page and issuing a request for a root page corresponding to the requested web page, wherein the root page identifies actual resources requested for loading the requested web page. The method also includes determining, based on a prior history of loading the requested web page, anticipated resources that are likely to be requested when loading the requested web page, and requesting the anticipated resources from a server associated with the anticipated resources at least until a time that the root page corresponding to the requested web page is received to determine the actual resources requested for loading the requested web page.

The subject technology further relates to a system for preloading resources of a web page. The system includes a memory storing executable instructions. The system also includes a processor coupled to the memory configured to execute the stored executable instructions to receive a user request to navigate to a web page and issue a request for a root page corresponding to the requested web page, wherein the root page identifies actual resources requested for loading the requested web page. The processor is also configured to determine, based on a prior history of loading the requested web page, anticipated resources that are likely to be requested when loading the requested web page, request the anticipated resources from a server associated with the anticipated resources at least until a time that the root page corresponding to the requested web page is received to determine the actual resources requested for loading the requested web page, and receive the requested anticipated resources. The processor is further configured to receive the requested root page, determine actual resources requested for loading the web page by parsing the received root page, and compare the anticipated resources to the actual resources, wherein if one of the determined actual resources corresponds to one of the received anticipated resources, use the received anticipated resource when loading the web page.

The subject technology also relates to a machine-readable storage medium comprising machine-readable instructions for causing a processor to execute a method for preloading resources of a web page. The method includes receiving a user request to navigate to a web page, and issuing a request for a root page corresponding to the requested web page, wherein the root page identifies actual resources requested for loading the requested web page. The method also includes determining, based on a prior history of loading the requested web page, anticipated resources that are likely to be requested for the web page as part of loading the web page, determining whether the anticipated resources are at least marked as cacheable or do not have a cache header, and requesting the anticipated resources from a server associated with the anticipated resources at least until a time that the root page associated with the web page is received and parsed to determine the actual resources requested for loading the web page, when the predicted resources are determined to be marked as cacheable or not having a cache header.

The subject technology further relates to a computer-implemented method for preloading resources of a web page. The method includes deploying a daemon to crawl a cache associated with the web page and issuing a request for a root page corresponding to the web page, wherein the root page identifies actual resources requested for loading the web page. The method also includes determining, based on a prior history of loading the web page, anticipated resources that are likely to be requested when loading the web page, and requesting the anticipated resources from a server associated with the anticipated resources at least until a time that the root page corresponding to the web page is received to determine the actual resources requested for loading the web page.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

Figure 1:
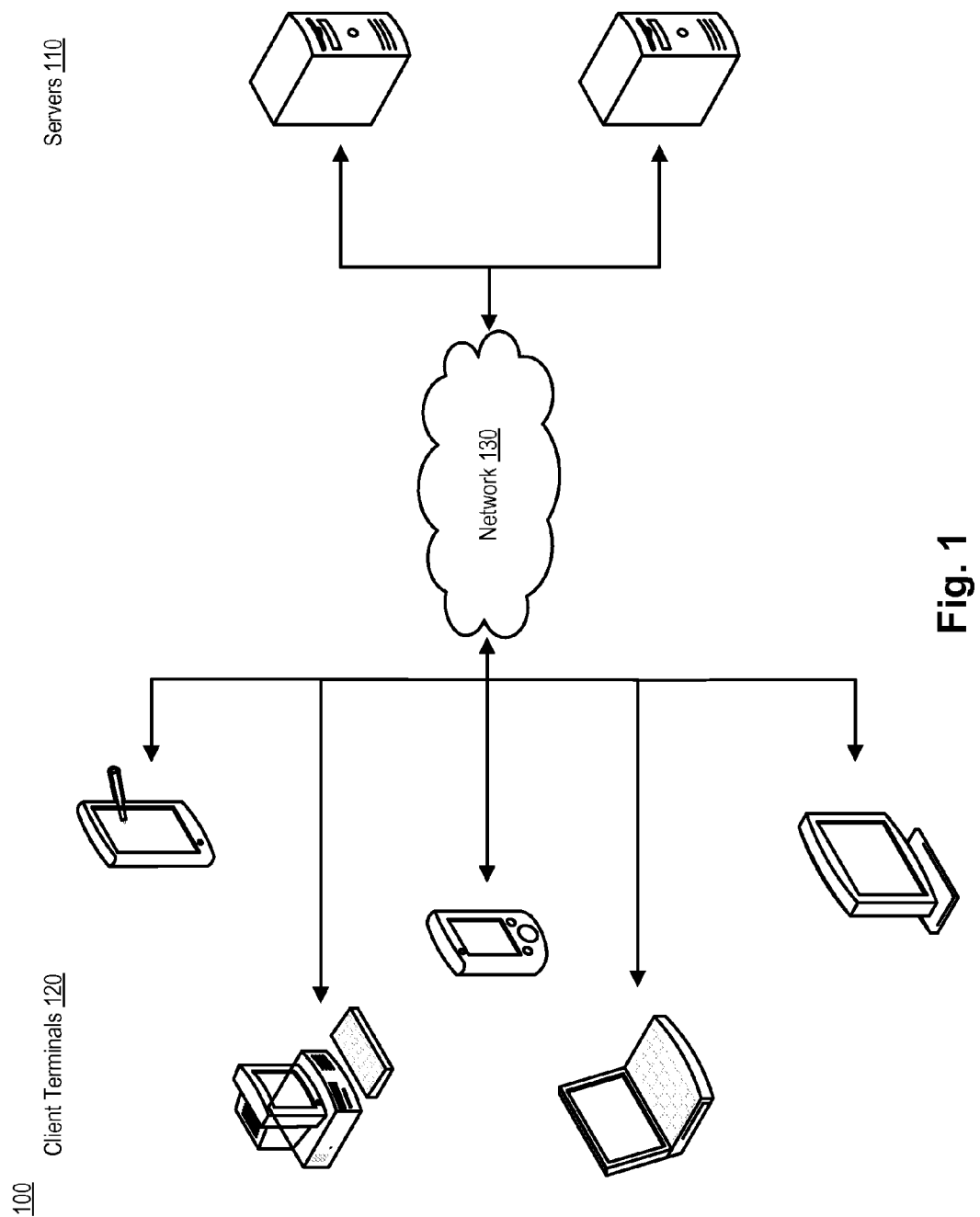
FIG. 1 illustrates an example architecture for preloading resources of a web page.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A typical web page may include many resources such as, for example, images, stylesheets and javascript files. To load a web page completely, a web browser downloads all of the resources included in the web page and processes them. This process may take a significant amount of time. When a web browser receives a user instruction to navigate to a web page (e.g., user selects a link to the web page or types in a URL in the navigation bar and presses "enter"), the web browser accesses a server hosting the web page, and first downloads the root (main) page. For example, the root page may be a hyper text markup language (HTML) page which is downloaded by a web browser when a web page is requested. Then the web browser parses the root page and determines from the parsed root page the resources it needs to fetch when loading the web page.

However, often times, more than a second passes between the user's instruction to navigate to the web page and the time the actual resources that need to be downloaded as part of loading the web page are identified. Furthermore, the resources still need to be accessed, downloaded and processed, which adds to the overall page load time. The overall page load time can be improved if some resources are predicted and pre-loaded. That is, resources that are likely to be requested for the web page as part of loading the web page (hereinafter "anticipated resources"), are determined and requested prior to identifying actual resources that are needed for loading the web page. The overall page load time is, therefore, improved when some resources are requested immediately after the user's instruction to navigate to the web page, but before the web browser has downloaded and parsed the root page.

The time it takes from the user's instruction to navigate to the web page to parsing the root page includes time for accessing the server hosting the web page, issuing a request for and downloading the root page, and parsing the downloaded root page. The parsing of the root page may begin after the page has been downloaded in its entirety, or when a sufficient amount of data has been downloaded for the root page to perform the parsing (e.g., 256 bytes).

According to another aspect of the subject technology, before the actual resources that are required for loading the web page are identified, connections may be established with servers at which those resources may be stored. If such servers are identified with good accuracy, the overall time for loading the web page may be reduced. Specifically, during the time between the user's instruction to navigate to the web page and the beginning of parsing of the downloaded root page, the web browser may identify the domains at which the resources for loading the web page are located and establish connections (e.g., TCP connections) to such domains while the root page is being downloaded and parsed. The domains may be identified based on historic data which may include details about prior loading sessions for the same web page. By establishing connections to the domains at which the page's resources may be located before parsing the root page, time may be saved in the overall page load time because the resources may be downloaded immediately without having to establish a new connection.

Further, domain name system (DNS) resolution for domain names or host names of anticipated resources can be performed, or begin to be performed, before receiving the user's instruction to navigate to the web page. Performing the DNS resolution for domain names or host names of anticipated resources will be hereinafter referred to as performing a "DNS pre-resolution" and is described in "Adaptive DNS Pre-Resolution," by Roskind, U.S. patent application Ser. No. 12/415,471, filed Mar. 31, 2009, which is hereby incorporated by reference in its entirety. The page load time may be reduced even further by preloading the resources as described below.

According to various aspects of the subject technology, a method and system for preloading resources of a web page are provided.

For the web pages that a user has previously accessed, a load record is kept which includes the details of prior loading sessions for the web page. The load record may include mappings of web pages to resources that have been requested for each web page. Based on the load record, resources that are likely to be re-requested by the web pages (anticipated resources) may be accurately determined. The load record may be stored, for example, in a datastore. The datastore may be stored at the user's client terminal or at a separate server. In an aspect of the subject technology, the load record is stored in the form of a datastore table with the following schema: URL of the root page, URL of the anticipated resource, cache header for the anticipated resource, number of hits (e.g., number of times the resource has been anticipated to be requested by the root page and was actually requested by the root page), number of misses (number of times the resource has been anticipated to be requested by the root page and was not actually requested by the root page), and number of consecutive misses (if the last load was a miss). The number of hits and/or misses of the anticipated resources for a predetermined number of previous page loads can also be included in the load record. The time at which each of the previous page loads occurred can also be stored in the load record. The datastore may be updated each time the web page is loaded to count the number of hits and/or misses.

An anticipated resource may require other dependent resources for loading the web page. For example, a javascript may be an anticipated resource, and may further require other dependent script files in order to function properly. The load record may also keep track of such dependent resources for each of the anticipated resources.

When a user request to navigate to a web page is received in the system, anticipated resources that are likely to be requested for that web page are determined and preloaded. The anticipated resources are determined based on the load record discussed above. The user request to navigate to a web page may be, for example, the user selecting a link to the web page, or typing in a URL of the web page in a user interface element of a web browser for receiving URLs of web pages to navigate to (e.g., address bar, URL bar).

The information on the order in which the resources were requested in the previous page loads may also be stored in the load record. For example, if in a number of previous loads for a certain web page, e.g. three previous loads, a style sheet, a javascript, and an image were requested and loaded in that order, such information may be stored in a load record. When anticipated resources are identified and preloaded for the same web page next time, preloading of the anticipated resources may be performed in the same order. The order in which the anticipated resources are preloaded can be changed based on the number of dependent resources of each anticipated resource. For example, an anticipated resource may be given higher priority if the anticipated resource has more dependent resources than the rest of the anticipated resources.

According to a further aspect of the subject technology, anticipated resources may be preloaded when the anticipated resources are determined with at least a threshold degree of accuracy. For example, anticipated resources may be determined and preloading will begin if the load record for the web page shows that an anticipated resource has been actually requested by the web page in more than 90% of the previous loads for the web page. An additional threshold may be implemented that requires that the anticipated resource also has been requested by the web page in the last two consecutive page loads. It may further be implemented that, only resources that are marked as explicitly cacheable (e.g., marked as cacheable in a cache header) or resources without a cache header are preloaded. The determination and preloading of anticipated resources may also be limited to those web pages for which data is available at least for three previous accesses and page loads (e.g., the user has accessed the web page at least three times in the past). The resources that are to be preloaded may be requested by, for example, using conditional GET requests, or may be requested from the network.

After the user provides instructions to navigate to a web page, along with determining and preloading the anticipated resources, the root page of the web page is received from the server hosting the web page. The received root page stores information or instructions for identifying the actual resources that are required for loading the web page. For example, the root page may contain HTML code which identifies the URL of the actual resources. The root page is parsed to determine the actual resources that are to be loaded for the web page. If an actual resource of the web page matches an anticipated resource that has been preloaded, instead of requesting the actual resource from a host server, the preloaded resource is used. If the actual resource does not match an anticipated resource and has not been preloaded, then the actual resource will be requested from the host server.

In an aspect of the subject technology, scripts (e.g., javascripts), stylesheets (e.g., CSS stylesheets) and images (e.g., JPG, TIFF, bitmap images) are preloaded. Also, resources are preloaded until sufficient data for the root page is received at the client terminal such that the root page may begin to be parsed. For example, a web browser at a user's client terminal may be set up to begin parsing a root page after the first 256 bytes of the page is received. In such cases, the anticipated resources are preloaded until the first 256 bytes of the root page are received at the client terminal. Afterward, the root page will be parsed and actual resources loaded based on the results of the parsing.

The subject technology is not limited to preloading only scripts, stylesheets, and images. Other anticipated resources may likewise be preloaded. Also, the subject technology is not limited to preloading until sufficient data is received for the root page to begin parsing. Preloading may continue after parsing the root page has begun.

The number of preloads of resources that occurs at the same time may be limited to a predetermined number per domain, so that the resource preloading does not interfere with the loading of the root page. For example, the number of simultaneous preloaded resources may be limited to three resources per domain. Further, for resources without cache headers, only those that are not on the same domain as the root page may be preloaded in order to prevent preloading resources that are dependent on cookies. Preloaded resources that are dependent on cookies may not be useable. Resources that are explicitly cacheable may not be able to depend on cookies. Among the anticipated resources that have been preloaded, some resources, (e.g., javascript and stylesheets) may need to be parsed after being downloaded. For example, javascript may need to be parsed before being used in loading the web page. Such resources may be parsed before actual resources that are required for loading the web page are determined, in order to increase the overall web page load efficiency even further.

In another aspect of the subject technology, pointers from the root page to its resources that are in the HTTP disk cache are stored separately. For example, the stored pointers may be similar to an HTTP referer which indentifies from the viewpoint of a resource the address of the root page which links to it. The pointers may be stored in a separate data store, or may be stored in the same datastore which stores the load record discussed above.

Also, when the indication is received from the user to navigate to a web page, resources that are cached (e.g., resources that have been previously requested for the web page and have been cached) at the client terminal for the web page may be iterated to determine whether the cached resources would generate a conditional GET request (e.g., a request which asks a server to return a resource only under a certain condition) and begin requesting such resources. Further, resources such as stylesheets and scripts (e.g., javascripts) may be prioritized before images when preloading. Also, preloading of images may be prioritized based on whether the images have been displayed higher up in the web page (e.g., images were displayed in the top portions of the web page such that users may view the images as soon as the web page is loaded without having to scroll down) for the previous page loads. Iterating through the cached resources and requesting the cached resources that would issue a conditional GET request would have a low number of false positives and therefore would not render the management of user's bandwidth less efficient. The number of false positives would be low since the cached resources are likely to be used again by the web page. Also, iterating through the cached resources and requesting the cached resources reduces the time spent sending the conditional GET requests and waiting for a response for each of the cached resources that is requested by the web page.

In addition, a daemon which crawls the cache and preloads the resources may also be used. The daemon would operate regardless of whether indication is received from the user to navigate to a web page. For example, the daemon can operate before, after, or in parallel to receiving the user indication to navigate to the web page. The daemon would crawl the cache to update the cached resources without modifying any markers for indicating when the resource was last used (e.g., information for indicating least-recently-used status).

The term "daemon" as used herein encompasses its plain and ordinary meaning including, but not limited to, a computer program that runs as a background process, rather than being under the direct control of an interactive user. The daemon may crawl the cache of a web browser at a user's client terminal to preload the cached resources automatically, without direct user input.

When determining the anticipated resources that are likely to be requested by the web page as part of loading the web page, some resources, or specific types of resources may be ignored. Therefore, no requests are sent to preload such resources. A list of the resources or the types of resources to ignore may be stored in a datastore. For example, certain features of a website such as mechanisms for indicating that a user has logged out of an account, or that the user's shopping cart at a web commerce site is empty, may be stored in the form of a resource. However, users may not wish to have such resources preloaded, since while the user may have logged out of an account or emptied the shopping cart for the past several times that the user has accessed the web page, the user may not wish to do so next time he or she access the web page. Preloading such resources may logout or empty the shopping cart against the user's will.

FIG. 1 illustrates an example architecture 100 for preloading resources of a web page. The architecture 100 includes servers 110 and client terminals 120 connected over a network 130. Each of the client terminals 120 may interact with users, and communicate with the servers 110 to preload resources of a web page. The servers 110 may be any device having a processor, memory, and communications capability for communicating with the client terminals 120 to receive web page/resource requests and send the requested web pages/resources. For example, the servers 110 may receive a request from a client terminal 120 for a root page of a web page, and send the requested root page to the client terminal. The client terminal 120 may also at the same time predict anticipated resources that are likely to be requested as part of loading the web page, and send a request to preload the anticipated resources to the servers 110. The servers 110 may then send the requested anticipated resources to the client terminal 120.

The client terminals 120 may be any computing device, such as, for example, a desktop computer, a laptop computer, a mobile device (e.g., a smartphone, tablet computer, or PDA), a set top box (e.g., for a television), television, video game console, home appliance (e.g., a refrigerator, microwave oven, washer or dryer) or any other device having a touch interface, processor, memory, and communications capability for interacting with the user, running an application (e.g., web browser) or executing logic for accessing web sites and web pages.

The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like.

Figure 2:
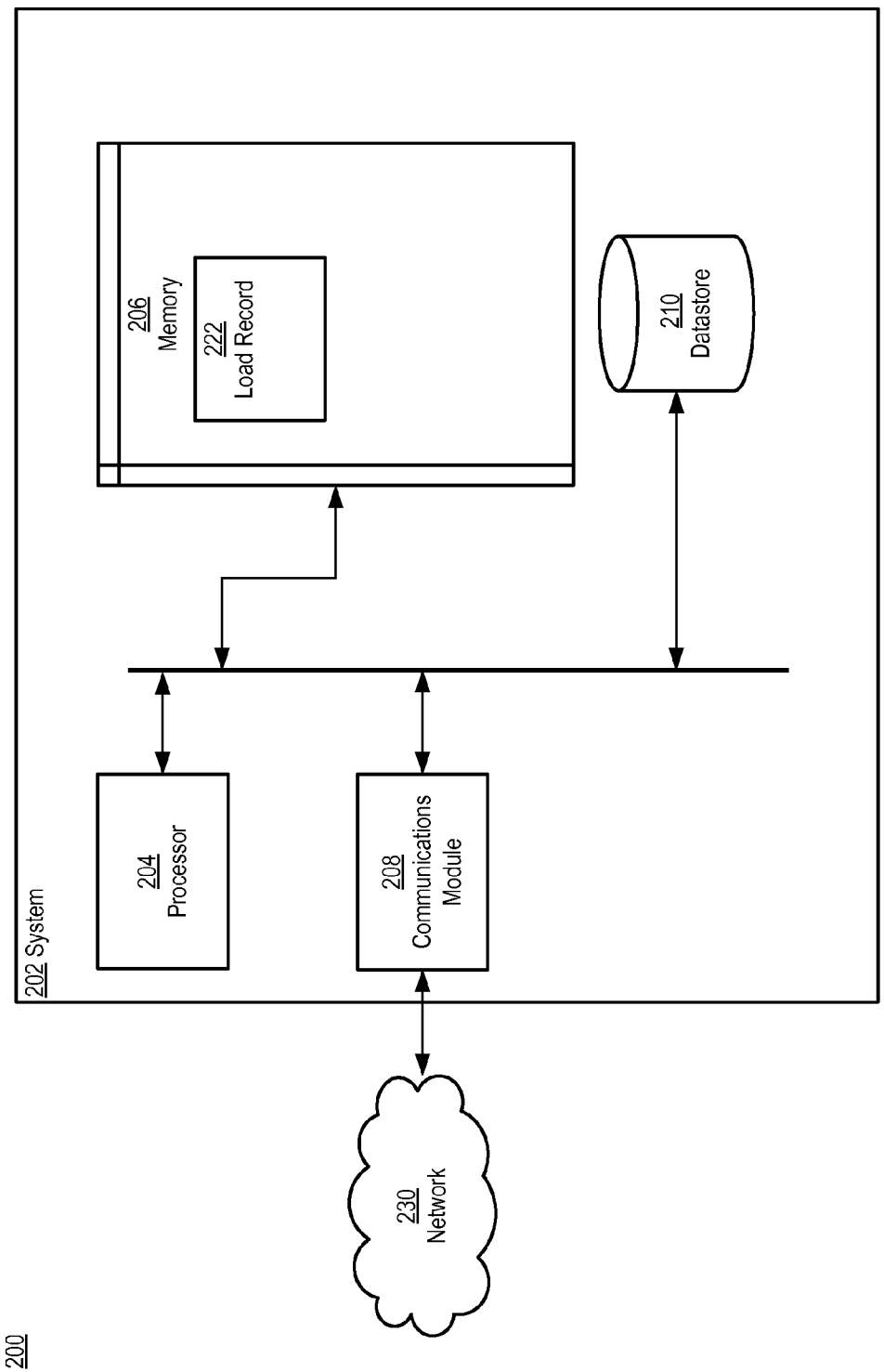
FIG. 2 is a block diagram illustrating an example system for preloading resources of a web page.

FIG. 2 is a block diagram 200 illustrating an example system 202 for preloading resources of a web page. The system 202 may be implemented, for example, at a client terminal 120. The system 202 includes a processor 204 and a memory 206. The system 202 may also include a communications module 208, and may be connected to the network 230 via the communications module 208. The network 230 may be, for example, the network 130. The communications module 208 is configured to interface with the network 230 to send and receive information, such as data, requests, responses, and commands to other devices (e.g., servers 110) or systems on the network 230. The data sent and received through the communications module 208 may also include requests for receiving the root page of a web page and/or anticipated or actual resources associated with the web page. The communications module 208 may be, for example, modems, Ethernet cards or mobile broadband adaptors.

The system 202 also includes a load record 222 which stores historical data regarding details of page loads for web pages that a user has previously accessed. The historical data stored in the load record may include mappings of web pages that a user has previously accessed to resources that have been previously requested by the web pages. Each entry of the load record 222 may include information regarding a web page-resource pair. For example, an entry of the load record 222 includes the URL of the root page of the web page, URL of a resource which has been requested by the web page previously, cache header for the resource, number of hits (e.g., number of times the resource has been predicted to be requested by the root page as part of loading the web page and was actually requested by the root page), number of misses (number of times the resource has been predicted and was not actually requested by the root page), and number of consecutive misses (if the last load was a miss). Other types of information such as, for example, the last time the web page was accessed and/or the last time the resource was requested may also be included in the entries of the load record 222. The load record 222 may be stored in the memory 206.

System 202 may also include a data store 210, which stores the load record 222. The data store 210 may be integrated with the memory 206, or may be independent from the memory and be in communication with the processor 204 and the memory. The data store 210 may also be implemented to be independent from the system 202 and in communication with the system.

The processor 204 is configured to execute instructions, such as instructions physically coded into the processor, instructions received in the form of software from the memory 206, or a combination of both. For example, the processor 204 is configured to execute instructions to receive a request to navigate to a web page from a user and issue a request for a root page associated with the web page, where the root page includes instructions for identifying actual resources associated with loading the web page. The processor 204 is also configured to determine anticipated resources that are likely to be requested for the web page based on prior history of loading the web page. The processor 204 is further configured to determine whether the predicted resources are marked as cacheable or do not have a cache header, and if the predicted resources are determined to be marked as cacheable or not having a cache header, request the anticipated resources from a server associated with the anticipated resources until such time as the root page associated with the web page is received and parsed to determine actual resources required by the web page. In case the predicted resources do not have a cache header, requests may be made only for those that are not on the same domain as the root page. The processor 204 is yet further configured to receive the requested anticipated resources from the server of the resources.

Figure 3:
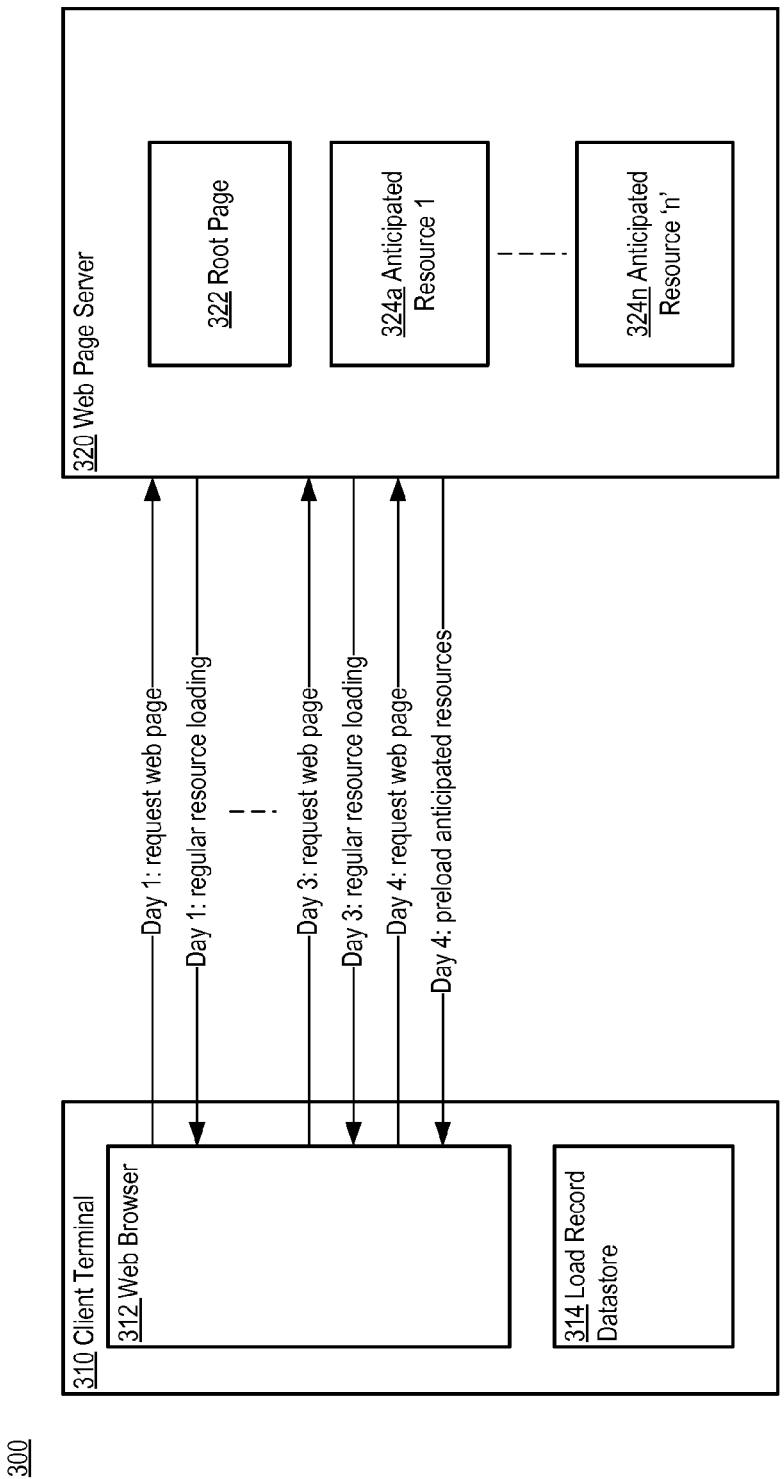
FIG. 3 is a diagram illustrating example operations for preloading resources of a web page.

FIG. 3 is a diagram 300 illustrating example operations for preloading resources of a web page. The operations may be performed, for example, by the system 202.

When a user requests at a client terminal 310 (e.g., a client terminal 120) and using a web browser 312, to navigate to a web page for the very first time on day 1, the web browser issues a request for the web page to a web page server 320 which hosts the web page. In response, the web page server 320 sends the root page 322 of the web page to the web browser 312. In addition to requesting the web page from the web page server 320, the web browser 312 also determines whether load record (e.g., load record 222) is available for the web page in the load record datastore 314 (e.g., memory 206 or datastore 210). Since the web page is accessed for the very first time on day 1, the load record for the web page is not identified by the web browser 312, and no resources will be preloaded. Therefore, the web page will load without preloading resources. For example, on day 1, all resources for the web page are requested after the root page 322 has been received at the web browser 312 and parsed. While or after the web page and its resources are loaded on day 1, an entry is created in the load record datastore 314 to store the details of the loading session for the web page on day 1. For example, information such as the URL of the root page, the URL of resources requested for the web page on day 1, and the order of the resources that are requested, may be stored in the load record datastore 314.

Diagram 300 shows example operations for preloading resources where the resources are predicted and preloaded when a load record for the requested web page is available in the load record datastore 314 at least for three previous page loads. On day 2, the user may access the web page for the second time. The web browser 312 determines whether enough load record is available for the web page in the load record data store 314. However, since load record is available for the web page only for a single load (for day 1), the web page is again loaded without preloading resources, as with day 1. While or after the page is loaded without preloading resources, the load record for the web page is updated with the loading details of day 2 in the load record datastore 314. On day 3, the user may access the web page for the third time, but since the load record is only available for 2 previous page loads (for days 1 and 2), the page will again be loaded without preloading resources, as with days 1 and 2, and the load record will be updated with load details of day 3.

On day 4, the user may access the web page for the fourth time. This time, after issuing a request for the root page 322, the web browser 312 determines whether enough load record is available for the web page in the load record datastore 314, and determines that load record is available for three previous page loads (days 1, 2 and 3). Therefore, on day 4, the web browser 312 predicts and preloads the resources for the web page.

Specifically, based on the load record, a determination is made as to the anticipated resources 324a-n that are likely to be requested by the root page 322 as part of loading the web page. Such determination of the anticipated resources may be made based on predetermined criteria. For example, the resources that have been requested for 90% of the previous page loads may be determined as anticipated resources. As another example, only those resources that are explicitly marked as cacheable or resources that do not have a cache header may be determined as anticipated resources. The order in which the resources are preloaded is also determined. Such order may be determined based on the information stored in the load record datastore 314, which reflects the order in which the resources were preloaded in the previous page loads for the web page.

After the anticipated resources 324a-n that are to be preloaded and the order in which they are preloaded are determined, the anticipated resources are requested based on the determined order. Such requests are made contemporaneously with, immediately before, or immediately after making a request for the root page 322. The number of simultaneous resource preload requests may be limited for each domain or host hosting the resources. Such limited simultaneous preload requests may reduce the likelihood that the preload requests interfere with the request for the root page 322. For example, the number of simultaneous preload requests may be limited to three requests per domain or host. While diagram 300 shows that the anticipated resources 324a-n are stored at the web page server 320, the one or more of the anticipated resources 324a-n may be stored at different servers.

When an anticipated resource (e.g., anticipated resource 324a) has finished preloading, if other anticipated resources for preloading still remains, the next anticipated resource may be preloaded, until all anticipated resources 324a-n are preloaded at the client terminal 310, or until parsing of the root page 322 begins. For example, the web browser 312 may be predetermined to begin parsing the root page 322 to determine, among other information, the actual resources to be requested for the web page after a predetermined amount of data is received for the root page. The predetermined amount may be, for example, 256 bytes. If the predetermined amount of data is received for the root page 322, the web browser 312 begins parsing the root page to determine the actual resources to be requested, and at that time, preloading of the resources will cease.

The web browser 312 may keep track of the anticipated resources that are preloaded. As the root page 322 is parsed to determine the actual resources to be used, if a preloaded anticipated resource is determined to actually be needed for the web page (e.g., the anticipated resources matches an actual resource), the preloaded anticipated resource is used for the web page instead of requesting the resource again from the server hosting the resource. Therefore, time for requesting the resource is saved. On the other hand, some of the actual resources may not have a corresponding anticipated resource. Such actual resources are requested from the server hosting the actual resource.

As the anticipated resources are being preloaded, the root page 322 is parsed, and actual resources needed for loading the web page are determined, the load record for the web page is updated with the load information in the load record datastore 314. For example, information such as the actual resources that are determined to be needed for the web page on day 4 or the number of hits and misses of the preloaded anticipated resources may be updated in the load record.

While diagram 300 shows example operations for preloading resources where the resources are predicted and preloaded if mapping information of the web page is available in the load record datastore 314 at least for three previous page loads, other criteria may also be used to anticipate and preload resources. For example, more than three or less than three previous page loads may be required before predicting and preloading.

Figure 4:
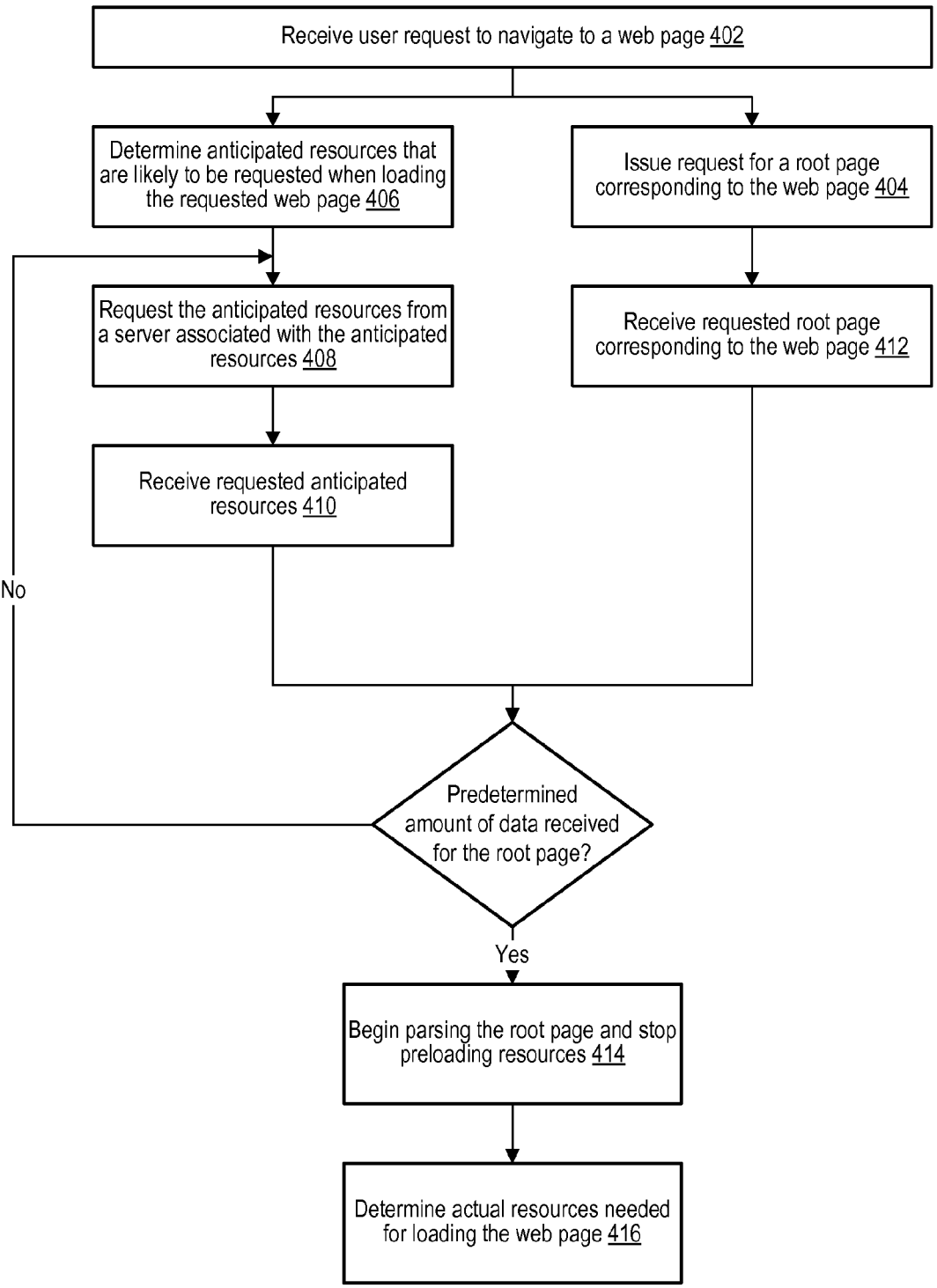
FIG. 4 illustrates an example flow diagram of example processes for preloading resources of a web page.

FIG. 4 illustrates an example flow diagram 400 of example processes for preloading resources for a web page. The operations of FIG. 4 may be performed, for example, by the system 202. However, the operations of FIG. 4 are not limited to such a system, and may be performed using other systems/configurations.

The operation begins in block 402 where a user request to navigate to a web page is received. In block 404, a request for a root page corresponding to the requested web page is issued. The root page comprises instructions for identifying actual resources requested for loading the requested web page. At the same time as, or immediately before or after block 404, anticipated resources that are likely to be requested when loading the requested web page are determined, in block 406. The determination of block 406 is based on a prior history of loading the requested web page. Also, the determination of block 406 may be made if sufficient information is available in the load record (e.g., load record 222) for the requested web page. For example, the determination may be made if load record for the previous three page loads are available for the requested web page. In block 408, the anticipated resources are requested from a server associated with the anticipated resources. The number of requests that may be made simultaneously may be limited for each domain or host. For example, a maximum of three simultaneous preload requests may be made for each domain or host. The requests for the anticipated resources may be sent to the server associated with the anticipated resources until a time that the root page corresponding to the requested web page is received to determine the actual resources requested for loading the requested web page. The determination of the actual resources may be made by parsing the received root page. In block 410, the requested anticipated resources for preloading are received.

As discussed above, a request for the root page for the requested web page is issued (block 404) at the same time as, or immediately before or after block 406. After the request for the root page is issued, the requested root page is received in block 412. After a predetermined amount of data is received for the root page (e.g., 256 bytes), in block 414, the received root page begins to be parsed, and at the same time, preloading of the resources ceases. In block 416, actual resources that are needed for the web page are determined based on the parsing of the root page in block 414.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include, but not limited to, firmware residing in read-only memory or applications stored in magnetic storage, which can be read into memory for processing by a processor. Also, in some aspects, multiple software aspects of the subject disclosure can be implemented as sub-parts of a larger program while remaining distinct software aspects of the subject disclosure. In some aspects, multiple software aspects can also be implemented as separate programs. Finally, any combination of separate programs that together implement a software aspect described here is within the scope of the subject disclosure. In some aspects, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
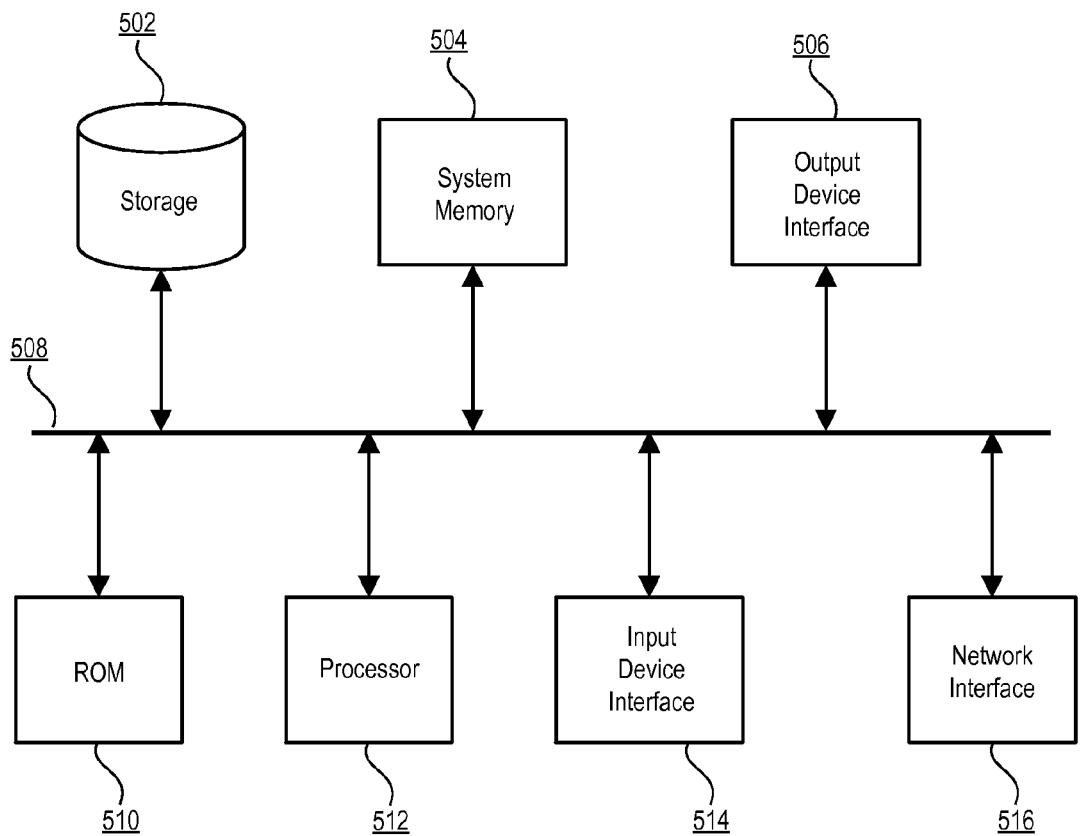
FIG. 5 conceptually illustrates an electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different aspects.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some aspects of the subject disclosure use a mass-storage device (such as a magnetic or optical disk and its corresponding disk drive) as permanent storage device 502.

Other aspects use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some aspects, the processes of the subject disclosure are stored in system memory 504, permanent storage device 502, and/or ROM 510. From these various memory units, processing unit(s) 512 retrieves instructions to execute and data to process in order to execute the processes of some aspects.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as televisions or other displays with one or more processors coupled thereto or embedded therein, or other appropriate computing devices that can be used for running an application. Some aspects include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some aspects include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some aspects are performed by one or more integrated circuits, such as application specific integrated circuits (ASICs) or field programmable gate arrays (FPGAs). In some aspects, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, aspects of the subject technology described in this specification can be implemented on a device having a display device, e.g., televisions or other displays with one or more processors coupled thereto or embedded therein, or other appropriate computing devices that can be used for running an application, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for preloading resources of a web page, the method comprising:
   receiving, by a web browser, a user request to navigate to a web page;
   issuing, by the web browser, a request for a root page corresponding to the requested web page, wherein the root page identifies actual resources required for loading the requested web page;
   determining, essentially concurrently with the issued root page request and based on a history of prior loading sessions for the same requested web page, anticipated resources that are likely to be requested as part of loading the requested web page;
   requesting, by the web browser, the anticipated resources from a server;
   concurrently receiving the requested root page and the requested anticipated resources; and
   ceasing to receive the requested anticipated resources when a predetermined amount of data for the requested root page has been received.

2. The method of claim 1, further comprising:
   determining actual resources requested for loading the web page by parsing the received requested root page; and
   comparing the anticipated resources to the actual resources, wherein, if one of the determined actual resources corresponds to one of the received anticipated resources, using the received anticipated resource when loading the requested web page.

3. The method of claim 1, wherein the anticipated resources are received until a time that the entire requested root page corresponding to the requested web page is received and parsed to determine the actual resources requested for loading the requested web page.

4. The method of claim 1, wherein the prior history of loading the requested web page comprises information on an order in which the actual resources were requested in a previous loading of the requested web page, wherein the requested anticipated resources are requested in the order in which the actual resources were requested in the previous loading.

5. The method of claim 1, wherein the prior history of loading the requested web page comprises at least one of a number of times that an anticipated resource has corresponded to an actual resource requested for loading the requested web page for a threshold number of consecutive web page loads, a number of times that the anticipated resource has not corresponded to an actual resource requested for loading the requested web page, or a number of times the anticipated resource has not corresponded to an actual resource requested for loading the requested web page consecutively.

6. The method of claim 1, wherein the prior history of loading the requested web page comprises a cache header for the anticipated resource.

7. The method of claim 1, wherein the anticipated resources are requested if the anticipated resources are at least one of marked as cacheable or do not have a cache header.

8. The method of claim 1, wherein the predetermined amount of data is 256 bytes.

9. The method of claim 1, wherein the step of determining the anticipated resources comprises determining that the prior history of loading the web page is available for more than a predetermined number of previous loads of the web page.

10. The method of claim 1, wherein the step of determining the anticipated resources further comprises determining the anticipated resources based on a resource cache, wherein the resource cache comprises a plurality of cached resources that have been previously requested for loading the requested web page.

11. The method of claim 10, further comprising updating the plurality of cached resources before receiving the user request to navigate to the web page.

12. A system for preloading resources of a web page, the system comprising:
   a memory storing executable instructions; and
   a processor coupled to the memory configured to execute the stored executable instructions to:
   receive, by a web browser, a user request to navigate to a web page;
   issue, by the web browser, a request for a root page corresponding to the requested web page, wherein the root page identifies actual resources required for loading the requested web page;

determine, essentially concurrently with the issued root page request and based on a history of prior loading sessions for the same requested web page, anticipated resources that are likely to be requested as part of loading the requested web page;

request, by the web browser, the anticipated resources from a server;

concurrently receive the requested root page and the requested anticipated resources;

cease to receive the requested anticipated resources when a predetermined amount of data for the requested root page has been received;

determine actual resources requested for loading the web page by parsing the received requested root page; and compare the anticipated resources to the actual resources, wherein if one of the determined actual resources corresponds to one of the received anticipated resources, use the received anticipated resource when loading the web page.

13. The system of claim 12, wherein the anticipated resources are received until a time that the entire requested root page corresponding to the requested web page is received and parsed to determine the actual resources requested for loading the requested web page.

14. The system of claim 12, wherein the prior history of loading the requested web page comprises information on an order in which the actual resources were requested in a previous loading of the requested web page.

15. The system of claim 12, wherein the prior history of loading the requested web page comprises at least one of a number of times an anticipated resource has corresponded to an actual resource associated with loading the requested web page, a number of times the anticipated resource has not corresponded to an actual resource associated with loading the requested web page, or a number of times the anticipated resource has not corresponded to an actual resource requested for loading the requested web page consecutively.

16. The system of claim 12, wherein the prior history of loading the requested web page comprises a cache header for the anticipated resource.

17. The system of claim 12, wherein the anticipated resources are requested if the anticipated resources are at least one of marked as cacheable or do not have a cache header.

18. The system of claim 12, wherein the step of determining the anticipated resources further comprises determining the anticipated resources based on a resource cache, wherein the resource cache comprises a plurality of cached resources that have been previously requested for loading the requested web page.

19. A non-transitory machine-readable storage medium comprising machine-readable instructions for causing a processor to execute a method for preloading resources of a web page, the method comprising:

receiving, by a web browser, a user request to navigate to a web page;

issuing, by the web browser, a request for a root page corresponding to the requested web page, wherein the root page identifies actual resources required for loading the requested web page;

determining, essentially concurrently with issuing the root page request and based on a history of prior loading sessions for the same requested web page, anticipated resources that are likely to be requested as part of loading the requested web page;

determining whether the anticipated resources are at least marked as cacheable or do not have a cache header;

requesting the anticipated resources from a server when the predicted resources are determined to be marked as cacheable or not having a cache header;

concurrently receiving the requested root page and the requested anticipated resources; and ceasing to receive the requested anticipated resources when a predetermined amount of data for the requested root page has been received.

20. A computer-implemented method for preloading resources of a web page, the method comprising:

using a daemon to crawl a cache associated with the web page;

issuing, by a web browser, a request for a root page corresponding to the web page, wherein the root page identifies actual resources required for loading the web page;

determining, essentially concurrently with the issued root page request and based on a history of prior loading sessions for the same requested web page, anticipated resources that are likely to be requested as part of loading the requested web page;

requesting, by the web browser, the anticipated resources from a server;

concurrently receiving the requested root page and the requested anticipated resources; and ceasing to receive the requested anticipated resources when a predetermined amount of data for the requested root page has been received.

21. The method of claim 1, further comprising:

determining a priority for each anticipated resource based on the number of dependent resources associated with the anticipated resource; and receiving the anticipated resources in the order of the determined priorities.

* * * * *